United States Patent
Wang

(10) Patent No.: US 11,909,652 B2
(45) Date of Patent: Feb. 20, 2024

(54) METHOD, DEVICE AND STORAGE MEDIUM FOR QUALITY OF SERVICE (QOS) FLOW MANAGEMENT OF TIME SENSITIVE DATA FOR TRANSMISSION OF ETHERNET PACKET FILTER SETS

(71) Applicant: TENCENT TECHNOLOGY (SHENZHEN) COMPANY LIMITED, Guangdong (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 297 days.

(21) Appl. No.: 17/462,253

(22) Filed: Aug. 31, 2021

(65) Prior Publication Data
US 2021/0399989 A1    Dec. 23, 2021

Related U.S. Application Data

(63) Continuation of application No. PCT/CN2020/091188, filed on May 20, 2020.

(30) Foreign Application Priority Data

Jun. 17, 2019    (CN) .......................... 201910522143.1

(51) Int. Cl.
  H04L 47/24    (2022.01)
(52) U.S. Cl.
  CPC .................................. *H04L 47/24* (2013.01)

(58) Field of Classification Search
  CPC ..... H04L 47/24; H04L 67/1046; H04L 47/34; H04L 63/0428; H04L 63/0823;
  (Continued)

(56) References Cited

U.S. PATENT DOCUMENTS

2018/0338265 A1    11/2018    Goel et al.
2019/0109721 A1*    4/2019    Qiao ....................... H04L 47/24
(Continued)

FOREIGN PATENT DOCUMENTS

CN    106998544 A    8/2017
CN    109392013 A    2/2019
(Continued)

OTHER PUBLICATIONS

International Search Report of PCT/CN2020/091188 dated Aug. 11, 2020 [PCT/ISA/210].
(Continued)

*Primary Examiner* — Rushil P. Sampat
(74) *Attorney, Agent, or Firm* — Sughrue Mion, PLLC

(57) ABSTRACT

A method for data transmission, performed by a first device, such as a User Equipment (UE) or a User Plane Function (UPF) network element, is provided. The method includes: obtaining transmission data; determining, according to network type information included in an extended Ethernet packet filter set, that the transmission data is Time Sensitive Communication (TSC) data; determining a transmission characteristic of the TSC data according to the extended Ethernet packet filter set; and mapping, according to the transmission characteristic, the TSC data to a Quality of Service (QoS) flow corresponding to the transmission characteristic for transmission; and transmitting the TSC data based on the QoS flow.

20 Claims, 6 Drawing Sheets

(58) Field of Classification Search
CPC ......... H04L 67/10; H04L 67/12; H04L 67/51; H04L 67/60; H04L 69/04; H04L 69/22; H04W 24/02; H04W 4/30; H04W 12/03; H04W 12/04; H04W 12/06; H04W 12/08; H04W 28/0215; H04W 28/06; H04W 4/50; H04W 48/08; H04W 56/001; H04W 56/0055; H04W 56/0065; H04W 92/02; H04W 84/18; H04W 92/18; G06K 19/06028; G06K 19/06037; G06K 19/0723; G07C 9/00174; H04J 3/0667
See application file for complete search history.

(56) References Cited

U.S. PATENT DOCUMENTS

| | | | | |
|---|---|---|---|---|
| 2019/0313289 | A1* | 10/2019 | Huang-Fu | H04L 67/141 |
| 2020/0128432 | A1* | 4/2020 | Youn | H04W 28/10 |
| 2020/0259896 | A1* | 8/2020 | Sachs | H04J 3/0667 |
| 2020/0267785 | A1* | 8/2020 | Talebi Fard | H04W 40/248 |
| 2022/0224651 | A1* | 7/2022 | Rost | H04L 47/2491 |

FOREIGN PATENT DOCUMENTS

| | | |
|---|---|---|
| CN | 109600664 A | 4/2019 |
| CN | 110267312 A | 9/2019 |
| KR | 10-2015-0066335 A | 6/2015 |
| WO | 2016/161193 A1 | 10/2016 |
| WO | 2018/191109 A1 | 10/2018 |

OTHER PUBLICATIONS

Written Opinion of PCT/CN2020/091188 dated Aug. 11, 2020 [PCT/ISA/237].
Translation of Written Opinion of the International Searching Authority dated Aug. 11, 2020 in International Application No. PCT/CN2020/091188.
Extended European Search Report dated Jun. 15, 2022 in European Application No. 20827591.7.
Ericsson, "Provisioning of UE's TSC traffic pattern related information", 3GPP TSG-RAN WG3 Meeting #104, R3-192896, Reno, U.S.A., May 13-17, 2019 (5 pages total).
3GPP TS 23.501, V16.1.0, 3rd Generation Partnership Project; Technical Specification Group Services and System Aspects; System Architecture for the 5G System; Stage 2 (Release 16), May 2019 (367 pages total).
Korean Office Action dated Oct. 1, 2023 in Application No. 10-2021-7027295.

* cited by examiner

METHOD, DEVICE AND STORAGE MEDIUM FOR QUALITY OF SERVICE (QOS) FLOW MANAGEMENT OF TIME SENSITIVE DATA FOR TRANSMISSION OF ETHERNET PACKET FILTER SETS

CROSS-REFERENCE TO RELATED APPLICATION(S)

This application is a continuation application of International Application No. PCT/CN2020/091188, filed on May 20, 2020, which claims priority level to Chinese Patent Application No. 201910522143.1, filed with the China National Intellectual Property Administration, on Jun. 17, 2019, the disclosures of which are incorporated by reference in their entireties.

FIELD

The disclosure relates to the technical field of communications, and in particular, to a technology of data transmission and Quality of Service (QoS) flow management.

BACKGROUND

The 5th Generation (5G) (Release16, R16) version introduces Time Sensitive Communication (TSC) of Time Sensitive Network (TSN), so that 5G supports industrial automation manufacturing applications with precise time control.

TSC at least needs to implement the transmission of time synchronization messages between a terminal (also called a User Equipment (UE)) and a User Plane Function (UPF) network element, as well as the transmission of service data with a certain delay between the UE and the UPF.

The transmission of TSC data is based on Quality of Service (QoS) flow. The TSC data is generally transmitted using a unified QoS flow.

SUMMARY

Embodiments of the disclosure provide a method for data transmission, which may transmit different types of Time Sensitive Communication (TSC) data using different Quality of Service (QoS) flows, improving the accuracy of TSC data transmission. The embodiments of the disclosure also provide a corresponding method and device for QoS flow management, and a corresponding computer-readable storage medium.

A first aspect of the disclosure provides a method for data transmission, applicable to a first device, including:
 obtaining transmission data;
 determining, according to network type information included in an extended Ethernet packet filter set, that the transmission data is TSC data;
 determining a transmission characteristic of the TSC data according to the extended Ethernet packet filter set;
 mapping, according to the transmission characteristic, the TSC data to a QoS flow corresponding to the transmission characteristic for transmission; and
 transmitting the TSC data based on the QoS flow.

A second aspect of the disclosure provides a method for QoS flow management, applicable to a second device, the method including:
 receiving a session creation request from a first device;
 creating a first QoS flow according to the session creation request and a QoS management policy, the first QoS flow corresponding to a first extended Ethernet packet filter set, and the first extended Ethernet packet filter set including network type information and first information used for indicating a transmission characteristic; and
 transmitting the first extended Ethernet packet filter set to the first device.

A third aspect of the disclosure provides a device for data transmission, the device including:
 at least one memory configured to store program code; and at least one processor configured to read the program code and operate as instructed by the program code, the program code including:
 obtaining code configured to cause the at least one processor to obtain transmission data;
 first determining code configured to cause the at least one processor to determine, according to network type information included in an extended Ethernet packet filter set, that the transmission data is TSC data;
 second determining code configured to cause the at least one processor to determine, according to the extended Ethernet packet filter set, a transmission characteristic of the TSC data;
 mapping code configured to cause the at least one processor to map, according to the transmission characteristic, the TSC data to a QoS flow corresponding to the transmission characteristic; and
 transmission code configured to cause the at least one processor to transmit the TSC data based on the QoS flow.

In an embodiment, when the network type information is an Ethertype, the first determining code is configured to cause the at least one processor to:
 determine whether a parameter corresponding to the Ethertype of the transmission data indicates a TSC type; and
 when the parameter corresponding to the Ethertype is used for indicating the TSC type, determine that the transmission data is TSC data.

In an embodiment, the second determining code is configured to cause the at least one processor to:
 determine a data type of the TSC data;
 when the data type is an event type, determine that the transmission characteristic of the TSC data is a first characteristic; or
 when the data type is a general type, determine that the transmission characteristic of the TSC data is a second characteristic, a priority level of data transmitted based on the first characteristic in resource allocation and scheduling is higher than that of data transmitted based on the second characteristic.

In an embodiment, the second determining code is configured to cause the at least one processor to:
 obtain an indicator identifying an indicating bit of the data type;
 when the indicator is located in a first interval, indicate that the data type is the event type; or
 when the indicator is located in a second interval, indicate that the data type is the general type, the first interval corresponding to the first characteristic, and the second interval corresponding to the second characteristic.

In an embodiment, the mapping code is configured to cause the at least one processor to:
 when the data type is the event type, map the TSC data to a first QoS flow corresponding to the first characteristic; or when the data type is the general type, map the TSC data to a second QoS flow corresponding to the second characteristic.

In an embodiment, the extended Ethernet packet filter set further includes attribute information of a protocol header field of a Precision Time Protocol (PTP) or general Precision Time Protocol (gPTP).

The PTP/gPTP protocol is formulated by the Institute of Electrical and Electronics Engineers (IEEE).

The second determining code is further configured to cause the at least one processor to determine attribute information of the TSC data.

the mapping code is configured to cause the at least one processor to:

when the TSC data belongs to first attribute information, and the data type is the event type, map the TSC data to a first QoS flow corresponding to the first characteristic for transmission;

when the TSC data belongs to first attribute information, and the data type is the general type, map the TSC data to a second QoS flow corresponding to the second characteristic for transmission;

when the TSC data belongs to second attribute information, and the data type is the event type, map the TSC data to a third QoS flow corresponding to the first characteristic for transmission; or when the TSC data belongs to second attribute information, and the data type is the general type, map the TSC data to a fourth QoS flow corresponding to the second characteristic for transmission.

In an embodiment, the attribute information includes at least one of the following: a domainNumber, a Standardization Development organization Identity (SdoId), a source port identity, and versionPTP information.

In an embodiment, when the device is a user equipment (UE), the extended Ethernet packet filter set is issued to the UE by a Session Management Function (SMF) network element by using QoS rules; or when the device is a User Plane Function (UPF) network element, the extended Ethernet packet filter set is issued to the UPF network element by the SMF network element by using a Packet Detection Rule (PDR).

In an embodiment, the mapping code is configured to cause the at least one processor to map, when the device is the UE, the TSC data to an air interface resource indicated by the QoS flow corresponding to the transmission characteristic for uplink transmission.

In an embodiment, the mapping code is configured to cause the at least one processor to map, when the device is the UPF network element, the TSC data to a tunnel resource indicated by the QoS flow corresponding to the transmission characteristic for downlink transmission.

In an embodiment, the transmission code is further configured to cause the at least one processor to send a session creation request used for triggering a second device to create a QoS flow or a session modification request used for triggering the second device to modify the QoS flow.

In an embodiment, the transmission characteristic includes at least one of the following:

a resource type, a priority level, a Packet Delay Budget (PDB), a Packet Error Rate (PER), a Maximum Data Burst Volume (MDBV), an Average Window (AV), an Allocation Retention and Priority (ARP), a TSN Source Port ID and Destination Port ID pair, a QoS Flow Identity (QFI), or an Internet Protocol Differentiated Services Code Point Marking (IP DSCP Marking).

A fourth aspect of the disclosure provides a device for QoS flow management, the device including:

at least one memory configured to store program code; and at least one processor configured to read the program code and operate as instructed by the program code, the program code including:

receiving code configured to cause the at least one processor to receive a session creation request sent by a first device;

creating code configured to cause the at least one processor to create a first QoS flow according to the session creation request and a QoS management policy, the first QoS flow corresponding to a first extended Ethernet packet filter set, and the first extended Ethernet packet filter set including network type information and first information used for indicating a transmission characteristic; and sending code configured to cause the at least one processor to send to the first device the first extended Ethernet packet filter set corresponding to the first QoS flow.

In an embodiment, the program code further includes modification code, the receiving code is further configured to cause the at least one processor to receive a session modification request sent by the first device;

the modification code is configured to cause the at least one processor to modify the first QoS flow to a second QoS flow according to the session modification request and the QoS management policy, the second QoS flow corresponding to a second extended Ethernet packet filter set, and the second extended Ethernet packet filter set including network type information and second information used for indicating the transmission characteristics; and the sending code is further configured to cause the at least one processor to send the second extended Ethernet packet filter set to the first device.

In an embodiment, when the device is a UE, the first extended Ethernet packet filter set and the second extended Ethernet packet filter set are respectively included in QoS rules to be sent to the UE.

In an embodiment, when the first device is a UPF network element, the first extended Ethernet packet filter set and the second extended Ethernet packet filter set are respectively included in a PDR to be sent to the UPF network element.

A fifth aspect of the disclosure provides a device for data transmission, including: a communication interface, a processor, and a memory; the memory being configured to store computer executable instructions; during operation of the device for data transmission, the communication interface being configured to execute actions executed by the transmission code in the first aspect or any possible implementation of the first aspect, and the processor executes the computer executable instructions stored in the memory, to execute actions executed by the first determining code, the second determining code, and the mapping code in the first aspect or any possible implementation of the first aspect.

A sixth aspect of the disclosure provides a device for QoS flow management, including: a communication interface, a processor, and a memory; the memory being configured to store computer executable instructions; during operation of the device for QoS flow management, the communication interface being configured to execute the actions executed by the receiving code and the sending code in the second aspect or any possible implementation of the second aspect, and the processor executes the computer executable instructions stored in the memory, to execute the actions executed by the creating code and the modification code in the second aspect or any possible implementation of the second aspect.

A seventh aspect of the disclosure provides a non-transitory computer-readable storage medium. The computer-readable storage medium stores instructions. The instructions, when run on a computer, causes the computer to perform the method according to the first aspect.

An eighth aspect of the disclosure provides a non-transitory computer-readable storage medium. The computer-readable storage medium stores instructions. The instructions, when run on a computer, causes the computer to perform the method according to the second aspect.

A ninth aspect of the disclosure provides a computer program product including instructions. The computer program product, when run on a computer, causes the computer to perform the method according to the first aspect.

A tenth aspect of the disclosure provides a computer program product including instructions. The instructions, when run on a computer, cause the computer to perform the method according to the second aspect.

BRIEF DESCRIPTION OF THE DRAWINGS

The above and/or other aspects of the disclosure will become apparent and more readily appreciated from the following description of the exemplary embodiments, taken in conjunction with the accompanying drawings.

DETAILED DESCRIPTION

The example embodiments of the disclosure will be described below with reference to the accompanying drawings. The described embodiments are merely some example embodiments rather than all of the embodiments of the disclosure. A person of ordinary skill in the art would understand that as the technology evolves and a new scenario emerges, the technical solutions provided in the embodiments of the disclosure are also applicable to a similar technical problem.

In the specification, claims, and the foregoing accompanying drawings of the disclosure, the terms "first", "second", and so on are intended to distinguish between elements rather than indicating a specific order. It is to be understood that the data used in such a way is interchangeable in proper cases, so that the embodiments described herein may be implemented in other orders than the order illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

Embodiments of the disclosure provide a method for data transmission, which may transmit different types of Time Sensitive Communication (TSC) data using different QoS flows, improving the accuracy of TSC data transmission. The disclosure further provides a corresponding device and a storage medium.

The method for data transmission according to the embodiments of the disclosure may be applied to a $5^{th}$ Generation (5G) network, or another network that supports TSC data transmission. The 5G network is described as an example for illustrative purposes.

Examples of the 5G network structure applicable to the disclosure will be described below with reference to the accompanying drawings.

Figure 1:
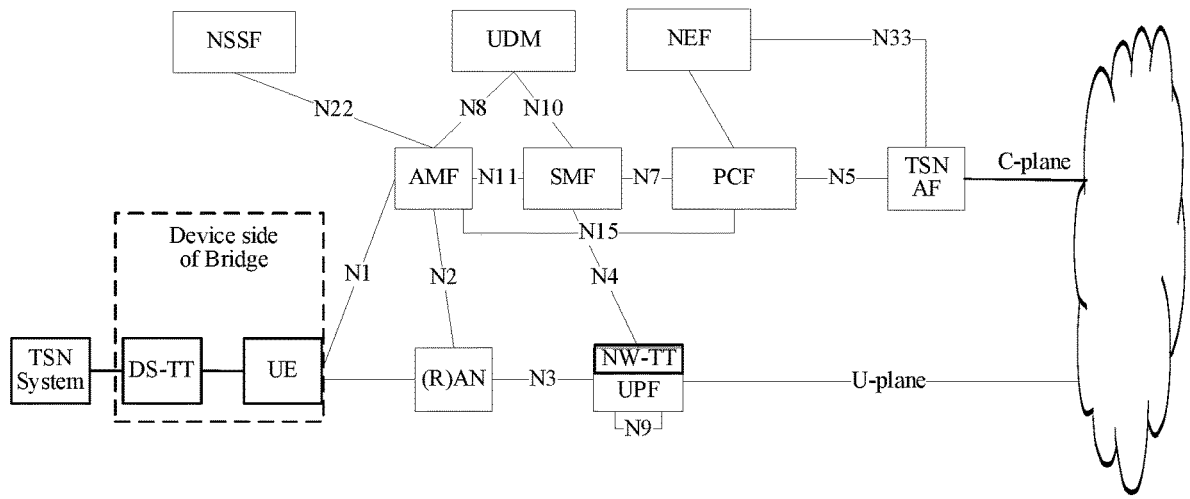
FIG. 1 is a schematic diagram of a network architecture of a $5^{th}$ Generation (5G) network according to an example embodiment of the disclosure.
Figure 2:
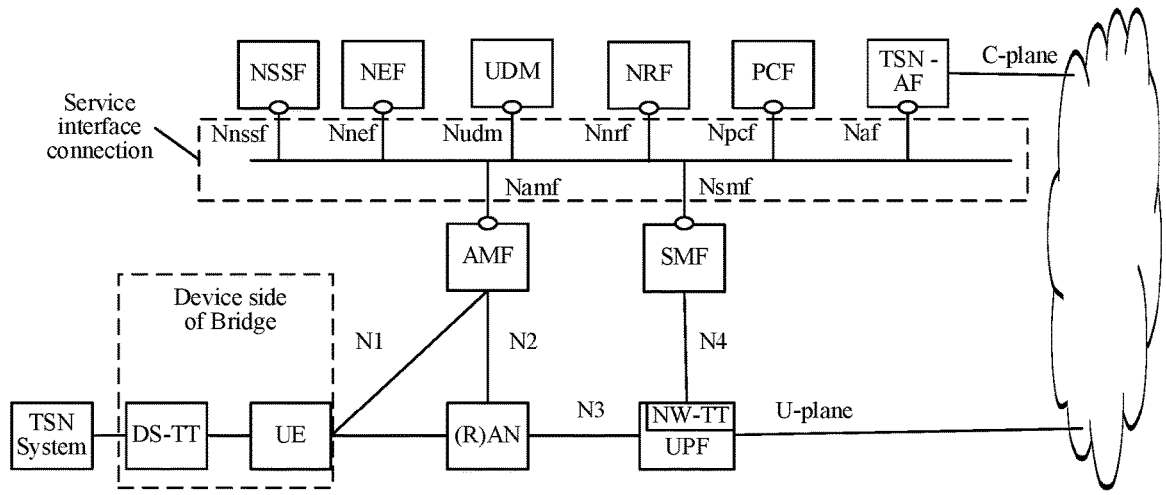
FIG. 2 is a schematic diagram of another network architecture of a 5G network according to an example embodiment of the disclosure.

FIG. 1 is a schematic diagram of a communication network architecture of a TSN in a 5G network of the disclosure. FIG. 2 is a schematic diagram of another communication network architecture of a TSN in a 5G network represented in the form of a service interface. A user equipment (UE), an Access Network or Radio Access Network (R)AN), and a User Plane Function (UPF) network element in FIG. 1 and FIG. 2 are generally called a U-plane network function network element or entity.

In the TSN, both the UE and the Device-side TSN translator (DS-TT) belong to the Device side of Bridge, and the Device side of Bridge is connected to a TSN system. The UPF network element includes a Network TSN translator (NW-TT).

In order to achieve this transparency to the TSN network and the appearance of 5GS as any other TSN bridge, 5GS provides TSN entry and exit ports through the DS-TT and the NW-TT. In an embodiment, the DS-TT and the NW-TT support the following functions:

hold and forward functions to eliminate jitter;
discovery and reporting of link layer connectivity.

The UE may include: a handheld terminal, a notebook computer, a subscriber unit, a cellular phone, a smart phone, a wireless data card, a Personal Digital Assistant (PDA) computer, a tablet computer, a modem, a handheld device, a laptop computer, a cordless phone or a Wireless Local Loop (WLL) station, a Machine Type Communication (MTC) terminal or another device that accesses the network. The UE and the access network device are in communication with each other using a certain air interface technology.

The (R)AN device is mainly responsible for functions such as radio resource management, QoS flow management, data compression and encryption on the air interface side. The access network device may include various forms of base stations, such as macro base stations, micro base stations (also called small stations), relay stations, and access points. In systems using different wireless access technologies, the names of devices with base station functions may be different. For example, in 5G systems, the devices are called gNB.

Other network elements in FIG. 1 and FIG. 2 are called C-plane network function network elements or entities, mainly responsible for achieving reliable and stable transmission of user-level traffic. A Session Management Function (SMF) network element is mainly responsible for user-plane network element selection, user-plane network element redirection, Internet Protocol (IP) address assignment, bearer establishment, modification and release, establishment or modification of QoS flow, etc. An Access and Mobility Management Function (AMF) network element is mainly responsible for signaling processing, such as access control, mobility management, attachment and de-attachment, and network element selection functions. A Policy Control Function (PCF) network element mainly supports the provision of a unified policy framework to control network behaviors, provides policy rules to C-plane network functions, and is responsible for obtaining user subscription information related to policy decisions. An Application Function (AF) network element mainly supports the interaction with the 3rd Generation Partner Project (3GPP) core network to provide services, such as influencing data routing decisions, policy control functions, or providing some three-party services for the network. A Network Slice Selection Function (NSSF) network element is mainly responsible for network slice selection. A Network Exposure Function (NEF) network element mainly supports the secure interaction between 3GPP network and third-party applications. The NEF may securely expose network capabilities and events to third parties to strengthen or improve the quality of application services. The 3GPP network may also securely obtain relevant data from the third parties to enhance the intelligent decision-making of the network, and moreover, the network element supports the restoration of structured data from the unified database or the storage of structured data in the unified database. A Unified Data Management (UDM) may be used for data management.

N1, N2, N3, N4 . . . appearing in FIG. 1 and FIG. 2 represent connection interfaces. The network elements in FIG. 1 are connected respectively, and data transmission may be carried out between the network elements with the connection relationship shown in FIG. 1. FIG. 2 uses the service interface connection. The NSSF network element, the NEF network element, the AMF network element, the SMF network element . . . and other network elements are connected on the same line. As shown in FIG. 2, service interfaces may be called to execute the corresponding services, and thus the communication is more convenient. Nnssf, Nnef, Nudm, Nnrf, Npcf, and Naf represent different service interfaces. In the network elements shown in FIG. 1 and FIG. 2, the UE may send uplink data and the UPF may send downlink data. No matter the UE sends uplink data or the UPF sends downlink data, when the data sent is TSC data, it is needed to map the TSC data to the QoS flow for transmission.

Figure 3:
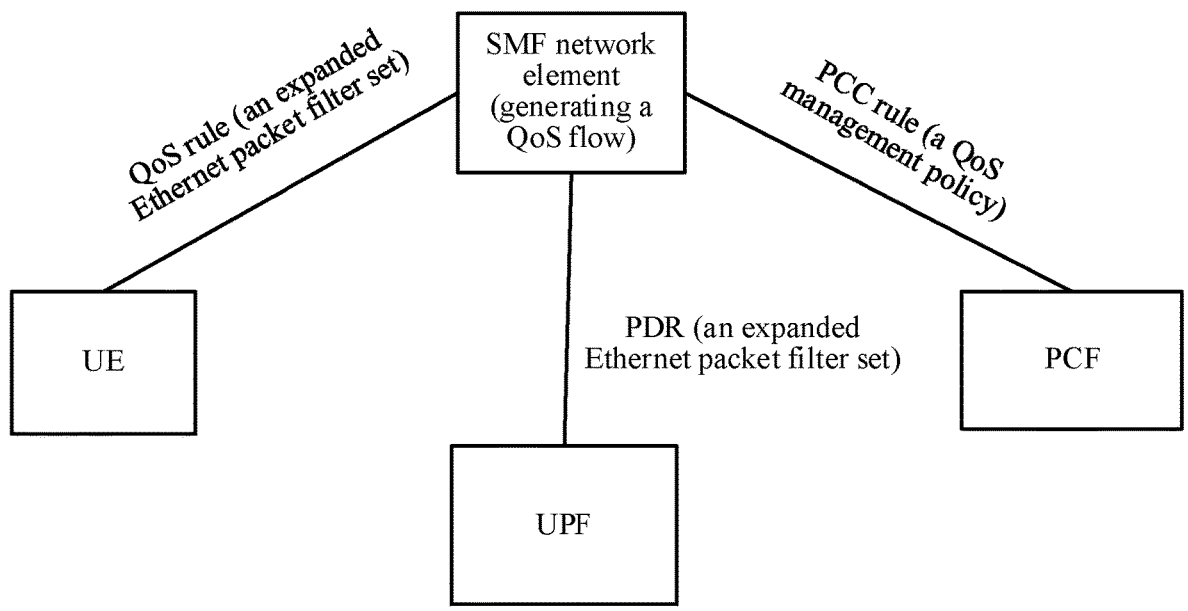
FIG. 3 is a schematic diagram of another network architecture of a 5G network according to an example embodiment of the disclosure.

FIG. 3 is a schematic diagram of another network architecture of a 5G network according to an example embodiment of the disclosure. In the embodiments of the disclosure, as shown in FIG. 3, QoS flows used by the UE and the UPF network element during mapping are generated by the SMF, and the SMF may receive a Policy and Charging Control (PCC) rule from the PCF network element. The PCC rule may include a QoS management policy. The SMF may create a QoS flow based on the session creation request sent by the UE according to the QoS management policy, or modify the QoS flow according to the session modification request. Each QoS flow corresponds to an extended Ethernet packet filter set, which includes attribute information of a protocol header field of network type information, Precision Time Protocol (PTP), or general Precision Time Protocol (gPTP). The attribute information includes at least one of the following: a domainNumber, a Standardization Development organization Identity (SdoId), a source port identity, and versionPTP information. The PTP/gPTP protocol is formulated by the Institute of Electrical and Electronics Engineers (IEEE). The SMF network element may carry the extended Ethernet packet filter set in the QoS rules to be sent to the UE, and is configured to determine the QoS flow according to the extended Ethernet packet filter set when the UE sends uplink TSC data. The SMF network element may also carry the extended Ethernet packet filter set in a Packet Detection Rule (PDR) to be sent to the UPF network element, and is configured to determine the QoS flow according to the Ethernet packet filter set when the UPF network element sends the downlink TSC data.

The process of creating a QoS flow and modifying the QoS flow by the SMF network element is first described below, and then the process of the UE or UPF network element performing data transmission based on the QoS flow provided by the SMF network element is described.

Figure 4:
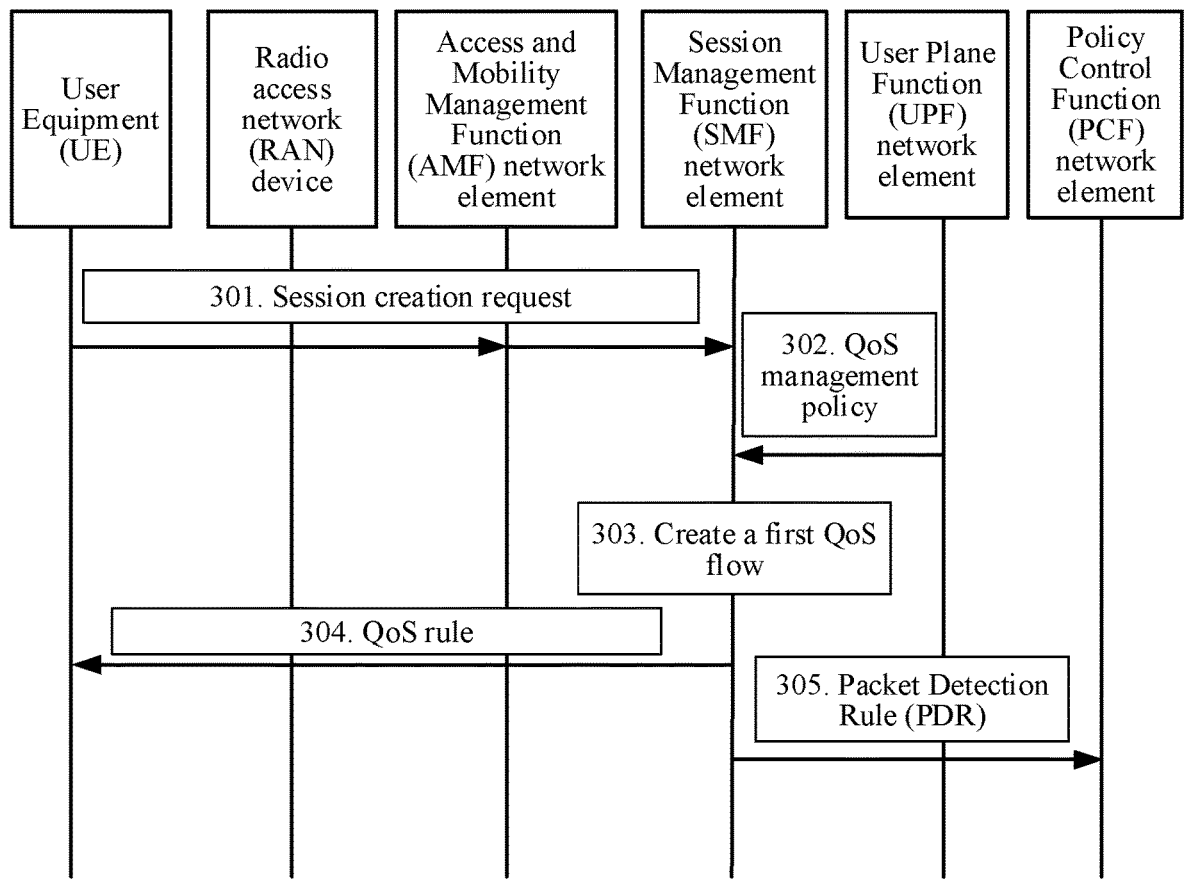
FIG. 4 is a schematic diagram illustrating a method for Quality of Service (QoS) flow management according to an example embodiment of the disclosure.

FIG. 4 is a schematic diagram illustrating a method for QoS flow management according to an example embodiment of the disclosure. As shown in FIG. 4, an embodiment of the method for QoS flow management according to the embodiments of the disclosure may include the following operations 301-305:

301. A UE initiates a session creation request.

The session creation request initiated by the UE may be initiated and forwarded to the SMF network element through the RAN and AMF network elements. The SMF network element may be selected by the AMF network element for the UE.

302. The SMF network element receives a QoS management policy from the PCF network element.

The PCF network element provides a PCC rule for the SMF network element, and the PCC rule may include the QoS management policy.

303. The SMF network element creates a first quality of service (QoS) flow according to the session creation request and the QoS management policy.

The QoS flow may be understood as a set of parameters related to the QoS, e.g., transmission path information that meets certain QoS characteristics. The transmission path information may include a source port identity, a source address, a destination port, and a destination address, etc. The QoS characteristic may include one or more of the following parameters: a resource type, a priority level, a Packet Delay Budget (PDB), a Packet Error Rate (PER), a Maximum Data Burst Volume (MDBV), an Average Window (AV), an Allocation Retention and Priority (ARP), jitter, and the like.

The first QoS flow corresponds to the first extended Ethernet packet filter set. The SMF may create the QoS flow based on the extended Ethernet packet filter set, so that different QoS flows may be created based on the different values of the parameters in the extended Ethernet packet filter set. In this way, the transmission of different TSC data is supported, for example, the transmission of TSC data in different domainNumbers may be supported.

The extended Ethernet packet filter set according to the embodiments of the disclosure, for example, the first extended Ethernet packet filter set may include:

source/destination Media Acess Control (MAC) address; and Ethertype.

The Ethertype may be included in the source or destination MAC address. The Ethertype may also be located behind the source or destination MAC address. When the Ethertype is indicated by a preset parameter, it is indicated that data to be transmitted is TSC data, and the preset parameter may be 0X88F7. It should be noted that 0X88F7 here is merely an example. As long as stipulated by agreement or negotiated in advance, other preset values may be used for indicating that the data to be transmitted is TSC data. Moreover, it is not limited to the preset parameter of Ethertype. For example, a special address may also appear in the source or destination Ethernet MAC address. In this case, it may also indicate TSC communication, that is, the data to be transmitted is TSC data.

The extended Ethernet packet filter set may also include the data type defined by the PTP/gPTP protocol header field, which may also be called MessageType. The data type may include event type and general type, where the event type may include the following four types:
a) Sync;
b) Delay_Req;
c) Pdelay_Req;
d) Pdelay_Resp.

The general type may include the following six types:
Announce;
Follow_Up;
Delay_Resp;
Pdelay_Resp_Follow_Up;
Management;
Signaling.

The event type and general type above are indicated by corresponding values in the extended Ethernet packet filter set, and may be understood with reference to Table 1:

TABLE 1

| MessageType | Messageclass | Value (hex) |
| --- | --- | --- |
| Sync | event | 0 |
| Delay_Req | event | 1 |
| Pdelay_Req | event | 2 |
| Pdelay_Resp | event | 3 |
| Reserved | — | 4-7 |
| Announce | general | 8 |
| Follow_Up | general | 9 |
| Delay_Resp | general | A |
| Pdelay_Resp_Follow_Up | general | B |
| Management | general | C |
| Signaling | general | D |
| Reserved | — | E-F |

Referring to Table 1, when the UE or UPF network element detects the extended Ethernet packet filter set and learns that an indicator of an indicating bit of MessageType (for example, the value in Table 1) is any value from 0 to 3, the to-be-transmitted data (or transmission data) is determined to be of the event type. When the indicator is determined to be any of 8, 9, and A-D, it may be determined that the transmission data is of the general type.

The extended Ethernet packet filter set may also include, for example, the following information defined in the PTP/gPTP protocol header field.
SdoId (MajorSdoId+MinorSdoId)/specific transportSpecific;
versionPTP information;
MessageType;
domainNumber;
Flags;
MessageTypeSpecific;
SourcePortIdentity;
SequenceId
controlField;
LogMessagInterval.

The first extended Ethernet packet filter set may include network type information, such as 0X88F7, and first information indicating transmission characteristics. The transmission characteristic may include at least one of the following:

a resource type, a priority level, a Packet Delay Budget (PDB), a Packet Error Rate (PER), a Maximum Data Burst Volume (MDBV), an Average Window (AV), an Allocation Retention and Priority (ARP), a TSN Source Port ID and Destination Port ID pair, a QoS Flow Identity (QFI), or an Internet Protocol Differentiated Services Code Point Marking (IP DSCP Marking).

The first information may be a first indicator of the MessageType, such as any indicator of 0-3, 8, 9, and A to D. The first information is not limited to the first indicator of the MessageType, and may also be other information that may be used for indicating the transmission characteristic.

304. The SMF network element sends the QoS rules to the UE.

The QoS rules include the first extended Ethernet packet filter set corresponding to the first QoS flow.

305. The SMF network element sends a PDR to the UPF network element.

The PDR includes the first extended Ethernet packet filter set corresponding to the first QoS flow.

A communication interface between the SMF network element and the UPF network element is N4 in FIG. 1 or FIG. 2.

Operations 301 to 305 describe, as an example, the generation of the first QoS flow and the first extended Ethernet packet filter set corresponding to the first QoS flow. In an embodiment, the SMF network element may generate a plurality of QoS flows for the UE. Moreover, the QoS flow may also be modified.

The process of modifying the QoS flow in the embodiments of the disclosure is described below with reference to FIG. 5.

Figure 5:
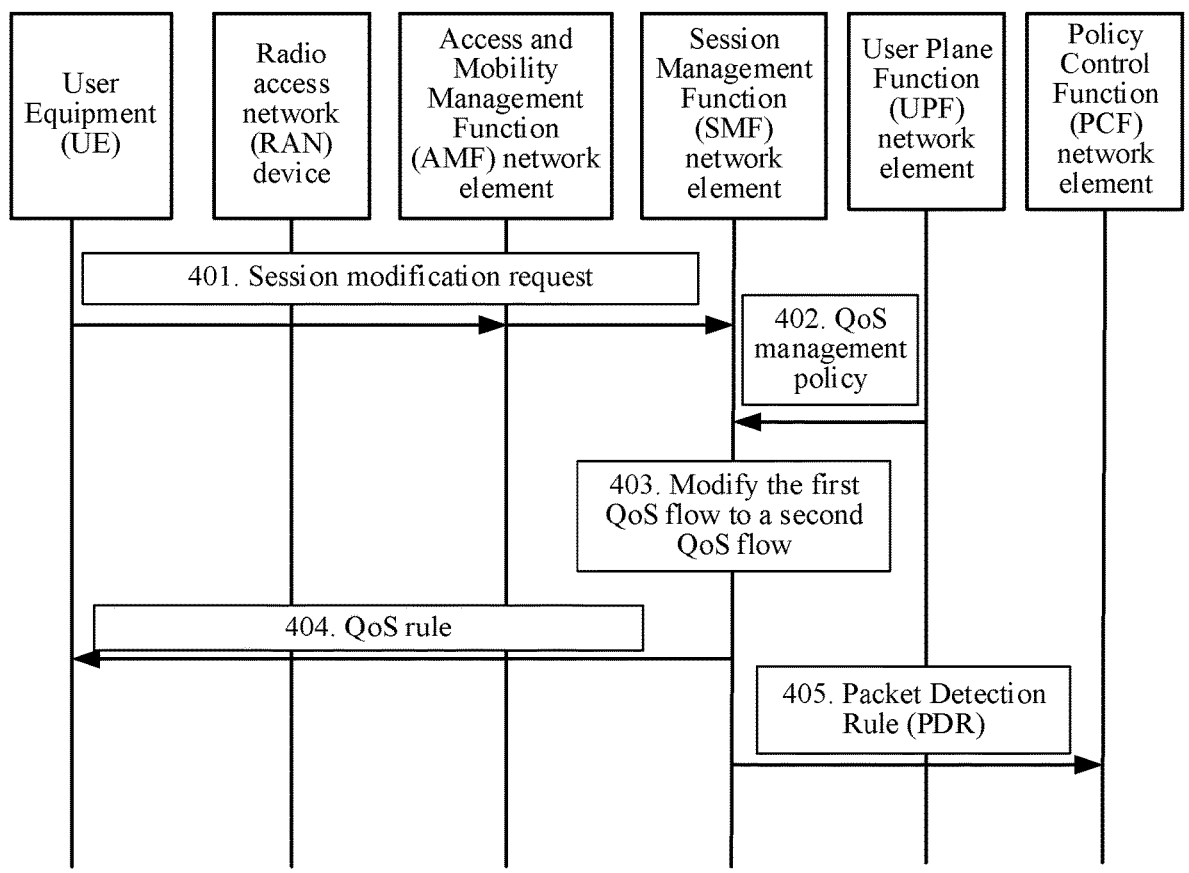
FIG. 5 is a schematic diagram illustrating a method for QoS flow management according to another example embodiment of the disclosure.

As shown in FIG. 5, another embodiment of the method for QoS flow management according to the embodiments of the disclosure may include the following operations 401-405:

401. A UE initiates a session modification request.

402. The SMF network element receives a QoS management policy from the PCF network element.

403. The SMF network element modifies a first QoS flow into a second QoS flow according to the session modification request and the QoS management policy.

The second QoS flow corresponds to a second extended Ethernet packet filter set. Reference may be made to the corresponding content in the first extended Ethernet packet filter set in operation 303 for understanding the content included in the second extended Ethernet packet filter set, and only the value of MessageType may be different.

The second extended Ethernet packet filter set may include network type information such as 0X88F7, and second information indicating the transmission characteristics. The second information may be a second indicator of MessageType, such as any indicator of 0-3, 8, 9, and A to D that is different from the first indicator.

404. The SMF network element sends the QoS rules to the UE.

The QoS rules include the second extended Ethernet packet filter set corresponding to second QoS flow.

405. The SMF network element sends a PDR to the UPF network element.

The PDR includes the second extended Ethernet packet filter set corresponding to the second QoS flow.

The solutions described in FIG. 4 and FIG. 5 in the embodiments of the disclosure are only intended to highlight the focus of the disclosure. In an actual message transmitting process, the participation of other devices or network elements may be needed. Reference may be made to the communication process of each network element between the existing 5G for understanding the participation process of other devices or network elements, and the disclosure is intended to expand based on the existing Ethernet packet filter set, so that during data transmission, a suitable QoS flow may be selected using corresponding information in the extended Ethernet packet filter set, transmitting different types of TSC data using different QoS flows. For example, TSC data of the event type and TSC data of the general type may be transmitted using different QoS flows, and TSC data of different domainNumbers may also be transmitted using different QoS flows, that is, the isolation of data transmission is implemented, and the accuracy of various types of data transmission may also be improved.

Based on the contents described above, the method for data transmission according to the embodiments of the disclosure is described below.

For ease of description, in the embodiments of the disclosure, the UE or UPF network element is called a first device, and the SMF network element is called a second device. The first device may also include other network elements or devices with the function executed by the UE or UPF network element of the disclosure, and the second device also includes other network elements or devices with the function executed by the SMF network element of the disclosure.

The method for data transmission according to the embodiments of the disclosure is described below with reference to FIG. 6.

Figure 6:
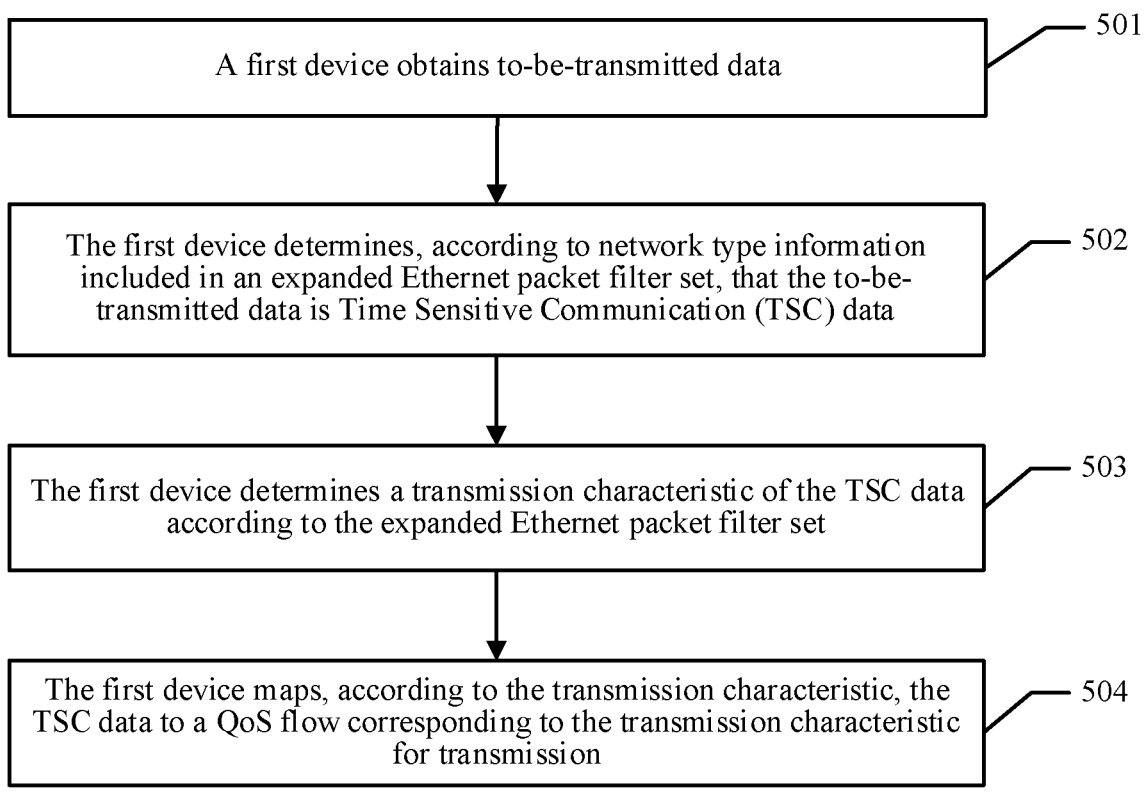
FIG. 6 is a schematic diagram illustrating a method for data transmission according to an example embodiment of the disclosure.

As shown in FIG. 6, the method for data transmission provided in an example embodiment of the disclosure includes operations 501-504:

501. A first device obtains to-be-transmitted data (or transmission data).

When the first device is a UE, the transmission data is uplink data, and when the first device is a UPF network element, the transmission data is downlink data.

502. The first device determines, according to network type information included in an extended Ethernet packet filter set, that the transmission data is TSC data.

The network type information may be a preset parameter of Ethertype described in the above embodiments, such as 0X88F7 or any other pre-specified or negotiated parameter value.

When the first device is a UE, the extended Ethernet packet filter set is issued to the UE by the SMF network element by using QoS rules. When the first device is a UPF network element, the extended Ethernet packet filter set is issued to the UPF network element by the SMF network element through a PDR.

503. The first device determines a transmission characteristic of the TSC data according to the extended Ethernet packet filter set.

The transmission characteristic includes at least one of the following:

the resource type, the priority level, the PDB, the PER, the MDBV, the AV, the ARP, the TSN Source Port ID and Destination Port ID pair, the QFI, or IP DSCP Marking.

504. The first device maps, according to the transmission characteristic, the TSC data to a QoS flow corresponding to the transmission characteristic for transmission.

The QoS flow may be understood as a set of parameters related to the QoS, e.g., transmission path information that meets certain QoS characteristics. The transmission path information may include a source port identity, a source address, a destination port, and a destination address, etc. The QoS characteristic may include one or more of the following parameters: the resource type, the priority level, the PDB, the PER, the MDBV, the AV, the ARP or jitter.

Mapping the TSC data to a QoS flow corresponding to the transmission characteristic may be understood as transmitting the TSC data using the parameters included in the QoS flow.

In the embodiments of the disclosure, during data transmission, when the transmission data is determined to be TSC data, different types of TSC data are transmitted using different QoS flows, improving the accuracy of TSC data transmission.

In an example embodiment, when the network type information is Ethertype, determining that the transmission data is TSC data according to the network type information included in the extended Ethernet packet filter set may include: determining whether a parameter corresponding to the Ethertype of the transmission data is used for indicating the TSC type, and when the parameter corresponding to Ethertype is used for indicating the TSC type, it is determined that the transmission data is TSC data.

In the embodiments of the disclosure, the Ethertype may be included in the source or destination MAC address, or the Ethertype is located behind the source or destination MAC address. When the Ethertype is indicated by a preset parameter, it is indicated that the transmission data is TSC data, and the preset parameter may be, as a non-limiting example, 0X88F7. As long as stipulated by agreement or negotiated in advance, other preset values may be used for indicating that the transmission data is TSC data. Moreover, it is not limited to the preset parameter of Ethertype. For example, a special address may also appear in the source or destination Ethernet MAC address, upon which it may be considered as TSC communication, that is, the transmission data is TSC data.

In an example embodiment, the data type is related to the transmission characteristic, and the transmission characteristics of the transmission data of different data types are different. Therefore, determining the transmission characteristic of the TSC data according to the extended Ethernet packet filter set may include: determining the data type of the TSC data; when the data type is an event type, determining that the transmission characteristic of TSC data is a first characteristic; and when the data type is a general type, determining that the transmission characteristic of TSC data is determined is a second characteristic, where the data transmitted based on the first characteristic has higher priority level in resource allocation and scheduling than the data transmitted based on the second characteristic.

In the embodiments of the disclosure, for the data type, reference may be made to the content described in operation 303 in the foregoing embodiment. For example, the content corresponding to Table 1 may be referred to. The first characteristic may be a first priority level, and the second characteristic may be a second priority level. The priority level may be a transmission priority level or a scheduling priority level. In general, the first priority level is higher than the second priority level, that is, the data transmitted based on the first characteristic has higher priority level in resource allocation and scheduling than the data transmitted based on the second characteristic.

The first characteristic may also be a first transmission delay, and the second characteristic may be a second transmission delay. The transmission characteristics in the embodiments of the disclosure may also be expressed by other parameters, which are not limited to the priority level and transmission delay listed here.

In an example embodiment, as shown in Table 1, the data type may be identified by the indicator on the indicating bit. Therefore, determining the data type of the TSC data may include: obtaining the indicator of the indicating bit that identifies the data type; when the indicator is located in a first interval (e.g., a first range of a value), indicating that the data type is an event type; and when the indicator is located in a second interval (e.g., a second range of a value), indicating that the data type is a general type, the first interval corresponding to the first characteristic, and the second interval corresponding to the second characteristic.

In the embodiments of the disclosure, the data type is indicated as a MessageType in Table 1. The indicating bit of the MessageType has an indicator, which may be a numerical value or other symbols, for example: 0 to F in Table 1. In Table 1, when the indicator is located in the first interval (the first interval may be, for example, an interval of 0-3), it is indicated that the data type is the event type. When the indicator is located in the second interval (the second interval may be, for example, an interval of 8, 9, and A to D), it is indicated that the data type is the general type.

It should be noted that Table 1 shows the judgment mode for illustrative purposes, and when the indicating bit of the MessageType has other regulations, the event type and the general type are distinguished according to the corresponding regulations.

In an example embodiment, since the transmission characteristic is related to the data type, the transmission characteristics of the transmission data of different data types are different, and the QoS flows used during transmission are also different. Accordingly, mapping, according to the transmission characteristic, the TSC data to the QoS flow corresponding to the transmission characteristic for transmission may include: when the data type is an event type, mapping the TSC data to a first QoS flow corresponding to the first characteristic for transmission; and when the data type is a general type, mapping the TSC data to a second QoS flow corresponding to the second characteristic for transmission.

In the embodiments of the disclosure, because the event type is more important, taking the priority level as an example, it may be expressed that the priority level of the data of the event type is higher than that of the data of the general type. In this way, when the QoS flow is used, the first QoS flow corresponding to the first characteristic is selected to transmit the TSC data of the event type. When the transmission data is data of the general type, the second QoS flow corresponding to the second characteristic with a lower priority level may be selected to transmit data of the general type.

In an example embodiment, the extended Ethernet packet filter set further includes attribute information of a protocol header field of the PTP/gPTP. Therefore, the method for data transmission according to the embodiments of the disclosure may further include: determining the attribute information of the TSC data, and then determining a QoS flow for transmitting the TSC data based on the attribute information. In this case, mapping, according to the transmission characteristic, the TSC data to the QoS flow corresponding to the transmission characteristic for transmission may include: when the TSC data belongs to first attribute information, and the data type is the event type, then mapping the TSC data to the first QoS flow corresponding to the first characteristic for transmission; when the TSC data belongs to the first attribute information, and the data type is the general type, then mapping the TSC data to the second QoS flow corresponding to the second characteristic for transmission; when the TSC data belongs to second attribute information, and the data type is the event type, then mapping the TSC data to a third QoS flow corresponding to the first characteristic for transmission; and when the TSC data belongs to the second attribute information, and the data type is the general type, then mapping the TSC data to a fourth QoS flow corresponding to the second characteristic for transmission. In an example embodiment, the attribute information includes at least one of the following: a domainNumber, a standardization development organization identity, a source port identity, and versionPTP information.

Since the attribute information includes at least one dimension of information, in an example embodiment of the disclosure, the use of QoS flows may be determined from multiple dimensions. The use of QoS flows may be first determined based on one dimension or multiple combined dimensions listed in the attribute information, and then determined based on the event type or the general type.

In an example embodiment, when the attribute information includes the domainNumber, determining the QoS flow for transmitting TSC data based on the attribute information may be, for example, determining the domainNumber of the TSC data. When the TSC data belongs to a first domainNumber, and the data type is the event type, then the TSC data is mapped to the first QoS flow corresponding to the first characteristic for transmission; when the TSC data belongs to the first domainNumber, and the data type is the general type, then the TSC data is mapped to the second QoS flow corresponding to the second characteristic for transmission; when the TSC data belongs to a second domainNumber, and the data type is the event type, then the TSC data is mapped to a third QoS flow corresponding to the first characteristic for transmission; and when the TSC data belongs to the second domainNumber, and the data type is the general type, then the TSC data is mapped to a fourth QoS flow corresponding to the second characteristic for transmission.

As described above, in the embodiments of the disclosure, the QoS flow may be determined based on the domainNumber. The isolation of transmission may be performed on TSC data of different domainNumbers. When the transmission data is TSC data of the first domainNumber, the TSC data is mapped to a QoS flow corresponding to the first domainNumber. When the transmission data is TSC data of the second domainNumber, the TSC data is mapped to a QoS flow corresponding to the second domainNumber, and then the data type of the TSC data is considered for different domainNumbers, so that QoS flows corresponding to different characteristics are selected.

For example, the TSC data of the Event type in Domain A may be mapped to the first QoS flow, such as a QoS Flow Xa. The TSC data of the general type in Domain A may be mapped to a second QoS flow, such as another QoS Flow Ya, and the priority of the QoS Flow Xa is higher than that of the QoS Flow Ya, that is, the priority value of the QoS Flow Xa is greater than that of the QoS Flow Ya.

The TSC data of the Event type in Domain B may be mapped to the third QoS flow, such as a QoS Flow Xb. The TSC data of the general type in Domain B may be mapped to a fourth QoS flow, such as another QoS Flow Yb, and the priority of the QoS Flow Xb is higher than that of the QoS Flow Yb, that is, the priority value of the QoS Flow Xb is graeter than that of the QoS Flow Yb.

In an example embodiment, when the attribute information includes a source port identity, determining the QoS flow for transmitting the TSC data based on the attribute information may, for example, include: determining the source port identity of the TSC data; when the TSC data belongs to a first source port identity, and the data type is the event type, then mapping the TSC data to the first QoS flow corresponding to the first characteristic for transmission; when the TSC data belongs to the first source port identity, and the data type is the general type, then mapping the TSC data to the second QoS flow corresponding to the second characteristic for transmission; when the TSC data belongs to a second source port identity, and the data type is the event type, then mapping the TSC data to a third QoS flow corresponding to the first characteristic for transmission; and when the TSC data belongs to the second source port identity, and the data type is the general type, then mapping the TSC data to a fourth QoS flow corresponding to the second characteristic for transmission.

As described above, in the embodiments of the disclosure, the QoS flow may be determined based on the source port identity. The isolation of transmission may be performed on TSC data of different source ports. When the transmission data is TSC data of a first source port, the TSC data is mapped to a QoS flow corresponding to the first source port. When the transmission data is TSC data of the second source port, the TSC data is mapped to a QoS flow corresponding to the second source port, and then the data type of the TSC data is considered for data of different source ports, so that QoS flows corresponding to different characteristics are selected.

For example, the TSC data of the Event type of source port identity A may be mapped to the first QoS flow, such as a QoS Flow Xa. The TSC data of the general type of source port identity A may be mapped to a second QoS flow, such as another QoS Flow Ya, and the priority of the QoS Flow Xa is higher than that of the QoS Flow Ya, that is, the priority value of the QoS Flow Xa is greater than that of the QoS Flow Ya.

The TSC data of the Event type in source port identity B may be mapped to the third QoS flow, such as a QoS Flow Xb. The TSC data of the general type in source port identity B may be mapped to a fourth QoS flow, such as another QoS Flow Yb, and the priority of the QoS Flow Xb is higher than that of the QoS Flow Yb, that is, the priority value of the QoS Flow Xb is greater than that of the QoS Flow Yb.

In an example embodiment, when the attribute information includes a domainNumber and a source port identity, determining the QoS flow for transmitting the TSC data based on the attribute information may, for example, include: determining the domainNumber and the source port identity of the TSC data; when the TSC data belongs to a first domainNumber and a first source port identity, and the data type is the event type, then mapping the TSC data to the first QoS flow corresponding to the first characteristic for transmission; when the TSC data belongs to the first domainNumber and the first source port identity, and the data type is the general type, then mapping the TSC data to the second QoS flow corresponding to the second characteristic for transmission; when the TSC data belongs to the first domainNumber and a second source port identity, and the data type is the event type, then mapping the TSC data to a third QoS flow corresponding to the first characteristic for transmission; and when the TSC data belongs to the first domainNumber and the second source port identity, and the data type is the general type, then mapping the TSC data to a fourth QoS flow corresponding to the second characteristic for transmission.

The embodiments of the disclosure describe a solution for determining a QoS flow based on three dimensions. QoS flows are determined based on the domainNumber and the source port identity, and which QoS flow is to be used is determined based on the event type or the general type.

In an example embodiment, the mapping, according to a transmission characteristic when the first device is a UE, the TSC data to a QoS flow corresponding to the transmission characteristic for transmission may include: mapping, by the UE, the TSC data to an air interface resource indicated by the QoS flow corresponding to the transmission characteristic for uplink transmission.

In the embodiments of the disclosure, for uplink data, the UE maps the TSC data to the air interface resources of the RAN for transmission.

In an example embodiment, the mapping, according to a transmission characteristic when the first device is a UPF network element, the TSC data to a QoS flow corresponding to the transmission characteristic for transmission may include: mapping, by the UPF network element, the TSC data to a tunnel resource indicated by the QoS flow corresponding to the transmission characteristic for downlink transmission.

In the embodiments of the disclosure, for downlink data, the UPF network element maps the TSC data to the corresponding tunnel resources for transmission. The tunnel resources may be understood with reference to the interfaces between the network elements in FIG. 1 and FIG. 2.

The above describes the network architecture, the method for QoS flow management, and the method for data transmission involved in the embodiments of the disclosure. The following introduces a device 60 for QoS flow management and a device 60 for data transmission provided by the embodiments of the disclosure with reference to the accompanying drawings.

Figure 7:
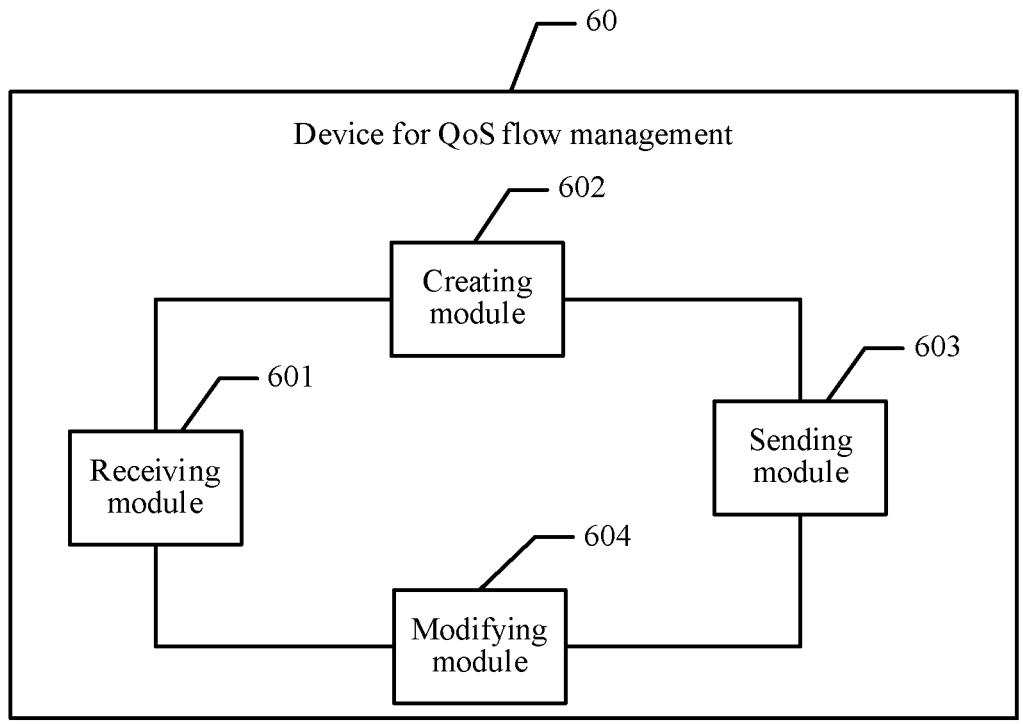
FIG. 7 is a schematic diagram illustrating a device for QoS flow management according to an example embodiment of the disclosure.

As shown in FIG. 7, an embodiment of the device 60 for QoS flow management according to the embodiments of the disclosure may include:

a receiving module 601, configured to receive a session creation request sent by a first device;

a creating module 602, configured to create a first QoS flow according to the session creation request received by the receiving module 601 and a QoS management policy, the first QoS flow corresponding to a first extended Ethernet packet filter set, and the first extended Ethernet packet filter set including network type information and first information used for indicating a transmission characteristic; and a sending module 603, configured to send to the first device the first extended Ethernet packet filter set corresponding to the first QoS flow created by the creating module 602.

The embodiments of the disclosure create different QoS flows for different types of TSC data. In this way, during transmission of the TSC data, different types of TSC data may be transmitted using different QoS flows, improving the accuracy of TSC data transmission.

In an example embodiment, the device further includes a modification module 604, the receiving module 601 is further configured to receive a session modification request sent by the first device;

the modification module 604 is configured to modify the first QoS flow to a second QoS flow according to the session modification request and the QoS management policy, the second QoS flow corresponding to a second extended Ethernet packet filter set, and the second extended Ethernet packet filter set including network type information and second information used for indicating the transmission characteristics; and the sending module 603 is further configured to send the second extended Ethernet packet filter set to the first device.

In an example embodiment, when the device is a UE, the first extended Ethernet packet filter set and the second extended Ethernet packet filter set are respectively included in QoS rules to be sent to the UE.

In an example embodiment, when the first device is a UPF network element, the first extended Ethernet packet filter set and the second extended Ethernet packet filter set are respectively included in a PDR to be sent to the UPF network element.

Figure 8:
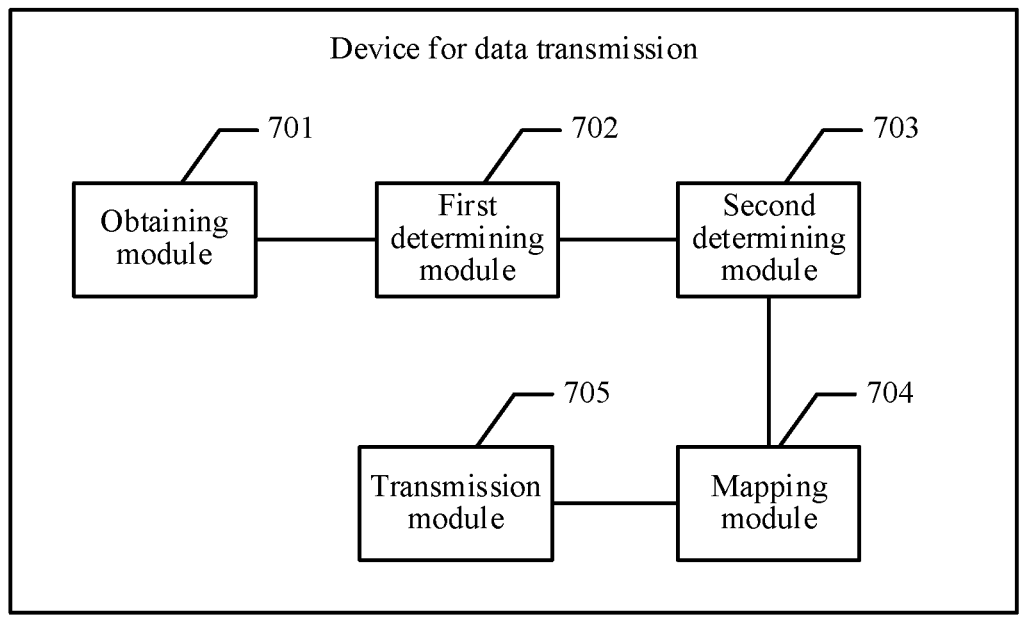
FIG. 8 is a schematic diagram of a device for data transmission according to an example embodiment of the disclosure.

As shown in FIG. 8, an embodiment of a device 70 for data transmission according to the embodiments of the disclosure may include:

an obtaining module 701, configured to obtain transmission data;

a first determining module 702, configured to determine, according to network type information included in an extended Ethernet packet filter set, that the transmission data obtained by the obtaining module 701 is TSC data;

a second determining module 703, configured to determine, according to the extended Ethernet packet filter set, a transmission characteristic of the TSC data determined by the first determining module 702;

a mapping module 704, configured to map, according to the transmission characteristic determined by the second determining module 703, the TSC data to a QoS flow corresponding to the transmission characteristic; and a transmission module 705, configured to transmit the TSC data based on the QoS flow mapped by the mapping module 704.

In the embodiments of the disclosure, during data transmission, when the transmission data is determined to be TSC data, different types of TSC data are transmitted using different QoS flows, improving the accuracy of TSC data transmission.

In an example embodiment, when the network type information is an Ethertype, the first determining module 702 is configured to:

determine whether a parameter corresponding to the Ethertype of the transmission data indicates a TSC type; and when the parameter corresponding to the Ethertype is used for indicating the TSC type, determine that the transmission data is TSC data.

In an example embodiment, the second determining module 703 is configured to:

determine a data type of the TSC data;

when the data type is an event type, determine that the transmission characteristic of the TSC data is a first characteristic; and when the data type is a general type, determine that the transmission characteristic of the TSC data is a second characteristic, a priority level of data transmitted based on the first characteristic in resource allocation and scheduling is higher than that of data transmitted based on the second characteristic.

In an example embodiment, the second determining module 703 is configured to:

obtain an indicator identifying an indicating bit of the data type;

when the indicator is located in a first interval, indicate that the data type is the event type; and when the indicator is located in a second interval, indicate that the data type is the general type, the first interval corresponding to the first characteristic, and the second interval corresponding to the second characteristic.

In an example embodiment, the mapping module 704 is configured to:

when the data type is the event type, map the TSC data to a first QoS flow corresponding to the first characteristic; and when the data type is the general type, map the TSC data to a second QoS flow corresponding to the second characteristic.

In an example embodiment, the extended Ethernet packet filter set further includes attribute information of a protocol header field of the PTP/gPTP. The second determining module 703 is further configured to: determine the attribute information of the TSC data.

The mapping module 704 is configured to:

when the TSC data belongs to first attribute information, and the data type is the event type, map the TSC data to a first QoS flow corresponding to the first characteristic for transmission;

when the TSC data belongs to first attribute information, and the data type is the general type, map the TSC data to a second QoS flow corresponding to the second characteristic for transmission;

when the TSC data belongs to second attribute information, and the data type is the event type, map the TSC data to a third QoS flow corresponding to the first characteristic for transmission; and when the TSC data belongs to second attribute information, and the data type is the general type, map the TSC data to a fourth QoS flow corresponding to the second characteristic for transmission.

In some possible implementations, the attribute information includes at least one of the following: a domainNumber, a Standardization Development organization Identity (SdoId), a source port identity, and versionPTP information.

When the attribute information is a domainNumber, the second determining module 703 is configured to determine a domainNumber of the TSC data.

The mapping module 704 is configured to:

when the TSC data belongs to a first domainNumber, and the data type is the event type, map the TSC data to a first QoS flow corresponding to the first characteristic;

when the TSC data belongs to a first domainNumber, and the data type is the general type, map the TSC data to a second QoS flow corresponding to the second characteristic;

when the TSC data belongs to a second domainNumber, and the data type is the event type, map the TSC data to a third QoS flow corresponding to the first characteristic; or when the TSC data belongs to a second domainNumber, and the data type is the general type, map the TSC data to a fourth QoS flow corresponding to the second characteristic.

When the attribute information is a source port identity, the second determining module 703 is configured to determine a source port identity of the TSC data.

The mapping module 704 is configured to:
when the TSC data belongs to a first source port identity, and the data type is the event type, map the TSC data to a first QoS flow corresponding to the first characteristic for transmission;
when the TSC data belongs to a first source port identity, and the data type is the general type, map the TSC data to a second QoS flow corresponding to the second characteristic for transmission;
when the TSC data belongs to a second source port identity, and the data type is the event type, map the TSC data to a third QoS flow corresponding to the first characteristic for transmission; or
when the TSC data belongs to a second source port identity, and the data type is the general type, map the TSC data to a fourth QoS flow corresponding to the second characteristic for transmission.

When the attribute information is a domainNumber and a source port identity, the second determining module 703 is configured to determine a domainNumber and a source port identity of the TSC data.

The mapping module 704 is configured to:
when the TSC data belongs to a first domainNumber and a first source port identity, and the data type is the event type, map the TSC data to a first QoS flow corresponding to the first characteristic for transmission;
when the TSC data belongs to a first domainNumber and a first source port identity, and the data type is the general type, map the TSC data to a second QoS flow corresponding to the second characteristic for transmission;
when the TSC data belongs to the first domainNumber and a second source port identity, and the data type is the event type, map the TSC data to a third QoS flow corresponding to the first characteristic for transmission; or
when the TSC data belongs to the first domainNumber and a second source port identity, and the data type is the general type, map the TSC data to a fourth QoS flow corresponding to the second characteristic for transmission.

In an embodiment, when the device is a UE, the extended Ethernet packet filter set is issued to the UE by a Session Management Function (SMF) network element by using QoS rules; or
when the device is a UPF network element, the extended Ethernet packet filter set is issued to the UPF network element by the SMF network element through a PDR.

In an example embodiment, the mapping module 704 is configured to map, when the device is the UE, the TSC data to an air interface resource indicated by the QoS flow corresponding to the transmission characteristic for uplink transmission.

In an example embodiment, the mapping module 704 is configured to map, when the device is the UPF network element, the TSC data to a tunnel resource indicated by the QoS flow corresponding to the transmission characteristic for downlink transmission.

In an example embodiment, the transmission module 705 is further configured to send a session creation request used for triggering a second device to create a QoS flow or a session modification request used for triggering the second device to modify the QoS flow.

In an example embodiment, the transmission characteristic includes at least one of the following:
the resource type, the priority level, the PDB, the PER, the MDBV, the AV, the ARP, the TSN Source Port ID and Destination Port ID pair, the QFI, or IP DSCP Marking.

It may be understood that the foregoing device for QoS flow management and the device for data transmission implement the foregoing functions, and include hardware structures and/or software modules corresponding to various functions. A skilled in the art would easily implement that in combination with the functions described in the embodiments disclosed herein, the disclosure may be implemented in the form of hardware or a combination of hardware and computer software. Whether a function is performed by hardware or computer software driving hardware depends on particular applications and design constraints of the technical solutions. A person skilled in the art may use different methods to implement the described functions for each particular application, but it is not to be considered that the implementation goes beyond the scope of the disclosure.

From the perspective of a physical apparatus, the foregoing device for QoS flow management and the device for data transmission may be implemented by a physical device, or implemented by a plurality of physical devices together, or may be a logical functional unit in a physical device, which are not specifically defined in the embodiments of the disclosure.

Figure 9:
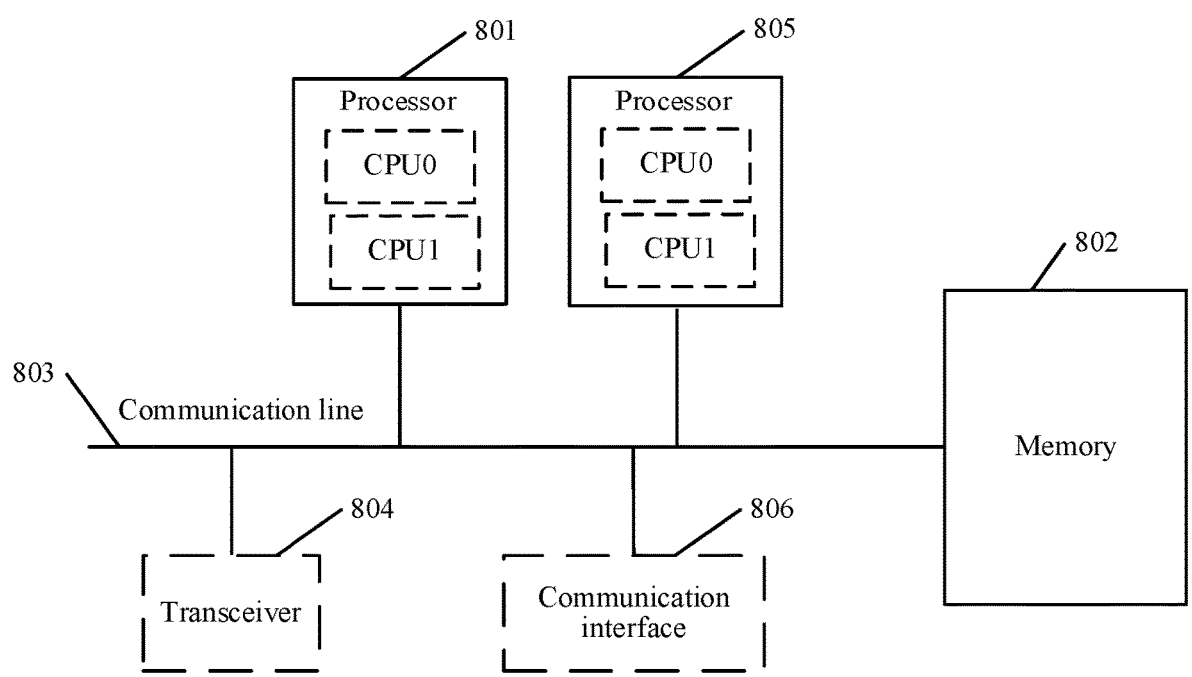
FIG. 9 is a schematic diagram illustrating a communication device according to an example embodiment of the disclosure.

For example, the device for QoS flow management or the device for data transmission may be implemented by the communication device in FIG. 9. FIG. 9 is a schematic structural diagram of hardware of a communication device according to an embodiment of the disclosure. The communication device includes at least one processor 801, a memory 802, and a communication line 803. The communication device may also include at least one of a transceiver 804 and a communication interface 806.

The processor 801 may be a Central Processing Unit (CPU), a microprocessor, an Application-Specific Integrated Circuit (ASIC), or one or more integrated circuits configured to control the execution of the solution procedure of the disclosure.

The communication bus 803 may include a channel, to transmit information between the foregoing components.

The transceiver 804 is in communication with other devices or communication networks using any transceiver apparatus, such as Ethernet, a Radio Access Network (RAN), a Wireless Local Area Networks (WLAN), etc. The transceiver 804 may also be a transceiver circuit or a transceiver. When the communication device is a first network functional entity, the communication device may include the transceiver.

The communication device may also include the communication interface 806.

The memory 802 may be a read-only memory (ROM) or a static storage device of another type that may store static information and instructions, a random access memory (RAM) or a dynamic storage device of another type that may store information and instructions, or an electrically erasable programmable read-only memory (EEPROM), a compact disc read-only memory (CD-ROM) or other optical disk storage, optical disc storage (including a compact disc, a laser disc, an optical disc, a digital versatile disc, or a Blu-ray disc, a disk storage medium or another magnetic storage device, or any other medium that may be used to carry or store expected program code in a command or data structure form and that may be accessed by a computer, but is not limited thereto. The memory may exist independently, and is connected to the processor 801 through the communication line 803. The memory 802 may also be integrated with the processor 801.

The memory 802 is configured to store computer-executable instructions for executing the solution of the disclosure, and the processor 801 controls the execution. The processor 801 is configured to execute the computer-executable instructions stored in the memory 802, so as to implement the method for QoS flow management or the method for data transmission according to the foregoing method embodiments of the disclosure.

In an embodiment, the computer-executable instructions in the embodiments of the disclosure may also be called application codes, which are not specifically limited in the embodiments of the disclosure.

In a specific implementation, as an embodiment, the processor 801 may include one or more CPUs, such as CPU0 and CPU1 in FIG. 9.

In a specific implementation, as an embodiment, the communication device may include a plurality of processors, such as the processor 801 and the processor 805 in FIG. 9. Each of these processors may be a single-CPU processor or a multi-core (multi-CPU) processor. The processor here may refer to one or more devices, circuits, and/or processing cores for processing data (for example, the computer-executable instructions).

From the perspective of functional units, the disclosure may divide the functional units of the device for QoS flow management or the device for data transmission according to the foregoing method embodiments. For example, each functional unit may be divided corresponding to each function, or two or more functions may be integrated in one functional unit. The integrated unit may be implemented in the form of hardware, or may be implemented in a form of a software functional unit.

The receiving module 601, the sending module 603, and the transmission module 705 may be implemented by the transceiver 804, and the creating module 602, the modifying module 604, the obtaining module 701, the first determining module 702, the second determining module 703, and the mapping module 704 may be implemented by the processor 801 or the processor 805.

All or some of the foregoing embodiments may be implemented by using software, hardware, firmware, or any combination thereof. When software is used for implementation, implementation may be entirely or partially performed in the form of a computer program product.

The computer program product includes one or more computer instructions. When the computer program instruction is loaded and executed on a computer, all or some of the procedures or functions according to the embodiments of the disclosure are generated. The computer may be a general-purpose computer, a dedicated computer, a computer network, or other programmable apparatuses. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (such as a coaxial cable, an optical fiber, or a digital subscriber line (DSL)) or wireless (such as infrared, radio, or microwave or the like) manner. The computer-readable storage medium may be any usable medium that may be stored by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk Solid State Disk (SSD)), or the like.

A person of ordinary skill in the art would understand that all or some of the operations of the methods in the embodiments may be implemented by a program instructing relevant hardware. The program may be stored in a computer readable storage medium. The storage medium may include: a ROM, a RAM, a magnetic disk, or an optical disc.

The embodiments of the disclosure extend the traditional Ethernet packet filter set, so that during data transmission, a suitable QoS flow is selected using corresponding information in the extended Ethernet packet filter set. During data transmission, whether the received transmission data is TSC data may be determined according to the network type information included in the extended Ethernet packet filter set. When it is determined that the transmission data is TSC data, a transmission characteristic of the TSC data is determined according to the extended Ethernet packet filter set, and different types of TSC data are transmitted using different QoS flows according to the transmission characteristic. Accordingly, the isolation of data transmission may be implemented, and the accuracy of TSC data transmission may be improved.

The method and device for data transmission, the method and device for QoS flow management, and the computer storage medium provided in the embodiments of the disclosure are described above in detail. Although the principles and implementations of the disclosure are described by using specific examples in this specification, the descriptions of the foregoing embodiments are merely intended to help understand the method and the core idea of the disclosure. Meanwhile, a person skilled in the art may make modifications to the specific implementations and application range according to the idea of the disclosure. In conclusion, the content of this specification shall not be construed as a limitation to the disclosure.

What is claimed is:

1. A method for data transmission, performed by a first device, the method comprising:

determining, according to network type information included in an extended Ethernet packet filter set, that transmission data is Time Sensitive Communication (TSC) data, the extended Ethernet packet filter set comprising attribute information of a protocol header field of a Precision Time Protocol (PTP) or general Precision Time Protocol (gPTP);

determining a transmission characteristic of the TSC data according to the extended Ethernet packet filter set; and mapping, according to the transmission characteristic, the TSC data to a Quality of Service (QoS) flow corresponding to the transmission characteristic for transmission based on a data type of the TSC data and the attribute information of the TSC data; and transmitting the TSC data based on the QoS flow, wherein the determining the transmission characteristic of the TSC data comprises, based on the data type of the TSC data being an event type, determining that the transmission characteristic of the TSC data is a first characteristic, and the mapping comprises, based on the TSC data belonging to first attribute information, and the data type being the event type, mapping the TSC data to a first QoS flow corresponding to the first characteristic for transmission.

2. The method according to claim 1, wherein the network type information is Ethertype, and the determining that the transmission data is the TSC data comprises:
based on a parameter corresponding to the Ethertype that indicates a TSC type, determining that the transmission data is TSC data.

3. The method according to claim 1, wherein the determining the transmission characteristic of the TSC data further comprises:
based on the data type of the TSC data being a general type, determining that the transmission characteristic of the TSC data is a second characteristic, a priority level of data transmitted based on the first characteristic in resource allocation and scheduling being higher than that of data transmitted based on the second characteristic.

4. The method according to claim 3, further comprising:
determining whether the data type is the event type or the general type according to a value of an indicating bit of the extended Ethernet packet filter set.

5. The method according to claim 3, wherein the mapping comprises:
based on the data type being the event type, mapping the TSC data to the first QoS flow corresponding to the first characteristic for transmission; or
based on the data type being the general type, mapping the TSC data to a second QoS flow corresponding to the second characteristic for transmission.

6. The method according to claim 3, wherein the mapping further comprises:
based on the TSC data belonging to the first attribute information, and the data type being the general type, mapping the TSC data to a second QoS flow corresponding to the second characteristic for transmission;
based on the TSC data belonging to second attribute information, and the data type being the event type, map the TSC data to a third QoS flow corresponding to the first characteristic for transmission; or
based on the TSC data belonging to the second attribute information, and the data type being the general type, mapping the TSC data to a fourth QoS flow corresponding to the second characteristic for transmission.

7. The method according to claim 6, wherein the attribute information comprises at least one of the following: a domainNumber, a standardization development organization identity, a source port identity, or versionPTP information.

8. The method according to claim 1, wherein based on the first device being a user equipment (UE), the extended Ethernet packet filter set is issued to the UE by a Session Management Function (SMF) network element by using QoS rules; and
based on the first device being a User Plane Function (UPF) network element, the extended Ethernet packet filter set is issued to the UPF network element by the SMF network element by using a Packet Detection Rule (PDR).

9. The method according to claim 1, wherein the first device is a UE, and the mapping comprises:
mapping, by the UE, the TSC data to an air interface resource indicated by the QoS flow corresponding to the transmission characteristic for uplink transmission.

10. The method according to claim 1, wherein the first device is a UPF network element, and the mapping comprises:
mapping, by the UPF network element, the TSC data to a tunnel resource indicated by the QoS flow corresponding to the transmission characteristic for downlink transmission.

11. The method according to claim 1, further comprising:
transmitting, to a second device, a session creation request that triggers creation of the QoS flow or a session modification request that triggers modification of the QoS flow.

12. The method according to claim 1, wherein the transmission characteristic comprises at least one of the following:
a resource type, a priority level, a Packet Delay Budget (PDB), a Packet Error Rate (PER), a Maximum Data Burst Volume (MDBV), an Average Window (AV), an Allocation Retention and Priority (ARP), a Time Sensitive Network (TSN) source port identity and destination port identity pair, a QoS Flow Identity (QFI), or an Internet Protocol Differentiated Services Code Point Marking (IP DSCP Marking).

13. A method for Quality of Service (QoS) flow management, performed by a second device, the method comprising:
receiving a session creation request from a first device;
creating a first QoS flow according to the session creation request and a QoS management policy, the first QoS flow corresponding to a first extended Ethernet packet filter set, and the first extended Ethernet packet filter set comprising first network type information, first information indicating a transmission characteristic, and attribute information of a protocol header field of a Precision Time Protocol (PTP) or general Precision Time Protocol (gPTP); and
transmitting the first extended Ethernet packet filter set to the first device,
wherein the first information includes a data type of first data corresponding to the first extended Ethernet packet filter set, and
wherein the attribute information comprises at least one of the following: a domainNumber, a standardization development organization identity, a source port identity, or versionPTP information.

14. The method according to claim 13, further comprising:
receiving a session modification request from the first device;
modifying the first QoS flow to a second QoS flow according to the session modification request and the QoS management policy, the second QoS flow corresponding to a second extended Ethernet packet filter set, and the second extended Ethernet packet filter set comprising second network type information and second information indicating the transmission characteristic; and
transmitting the second extended Ethernet packet filter set to the first device.

15. The method according to claim 14, wherein the first device is a User Equipment (UE), and the first extended Ethernet packet filter set and the second extended Ethernet packet filter set are respectively included in QoS rules to be transmitted to the UE.

16. The method according to claim 14, wherein the first device is a User Plane Function (UPF) network element, and the first extended Ethernet packet filter set and the second extended Ethernet packet filter set are respectively included in a Packet Detection Rule (PDR) to be transmitted to the UPF network element.

17. A device for data transmission, comprising:
at least one memory configured to store program code; and
at least one processor configured to read the program code and operate as instructed by the program code, the program code comprising:
first determining code configured to cause the at least one processor to determine, according to network type information included in an extended Ethernet packet filter set, that transmission data is Time Sensitive Communication (TSC) data, the extended Ethernet packet filter set comprising attribute information of a protocol header field of a Precision Time Protocol (PTP) or general Precision Time Protocol (gPTP);
second determining code configured to cause the at least one processor to determine, according to the extended Ethernet packet filter set, a transmission characteristic of the TSC data;
mapping code configured to cause the at least one processor to map, according to the transmission characteristic, the TSC data to a Quality of Service (QoS) flow corresponding to the transmission characteristic based on a data type of the TSC data and the attribute information of the TSC data; and
transmission code configured to cause the at least one processor to transmit the TSC data based on the QoS flow, wherein the second determining code is further configured to cause the at least one processor to determine, based on the data type of the TSC data being an event type, that the transmission characteristic of the TSC data is a first characteristic, and the mapping code is further configured to cause the at least one processor to map, based on the TSC data belonging to first attribute information and the data type being the event type, the TSC data to a first QoS flow corresponding to the first characteristic for transmission.

18. A device for Quality of Service (QoS) flow management, comprising: at least one processor and at least one memory, the at least one memory being configured to store instructions that are executable by the at least one processor to perform the method according to claim 13.

19. A non-transitory computer-readable storage medium, storing instructions that are executable by at least one processor to cause the at least one processor to execute the method according to claim 1.

20. A non-transitory computer-readable storage medium, storing instructions that are executable by at least one processor to cause the at least one processor to execute the method according to claim 13.

\* \* \* \* \*